United States Patent [19]

Gupta et al.

[11] Patent Number: 5,506,890
[45] Date of Patent: Apr. 9, 1996

[54] METHOD AND APPARATUS FOR GROUP-SPECIFIC CALLING

[75] Inventors: Alok K. Gupta, Marlboro; Ajay Jain, Holmdel; Shri P. Jain; Paramdeep S. Sahni, both of Marlboro, all of N.J.

[73] Assignee: AT&T Corp., Murray Hill, N.J.

[21] Appl. No.: 153,526

[22] Filed: Nov. 16, 1993

[51] Int. Cl.⁶ .................................................. H04M 1/64
[52] U.S. Cl. ........................... 379/67; 379/89; 379/209; 379/211; 379/212
[58] Field of Search ................................ 379/67, 88, 89, 379/207, 209, 211, 214, 212

[56] References Cited

U.S. PATENT DOCUMENTS

| | | |
|---|---|---|
| 3,939,309 | 2/1976 | Malmgren et al. . |
| 4,162,377 | 7/1979 | Mearns . |
| 4,191,860 | 3/1980 | Weber . |
| 4,277,649 | 7/1981 | Sheinbein . |
| 4,567,359 | 1/1986 | Lockwood . |
| 4,713,806 | 12/1987 | Oberlander et al. . |
| 4,720,850 | 1/1988 | Oberlander et al. . |
| 4,757,267 | 7/1988 | Riskin ............................ 379/88 |
| 4,788,718 | 11/1988 | McNabb et al. ................ 379/113 |
| 4,796,292 | 1/1989 | Thomas . |
| 4,827,500 | 5/1989 | Binkerd et al. . |
| 4,878,240 | 10/1989 | Lin et al. . |
| 5,042,064 | 8/1991 | Chung et al. . |
| 5,187,735 | 2/1993 | Garcia et al. .................. 379/88 |
| 5,199,062 | 3/1993 | Von Meister et al. ......... 379/205 |
| 5,227,874 | 7/1993 | Von Kohorn . |
| 5,369,695 | 11/1994 | Chakravorti et al. .......... 379/211 |

OTHER PUBLICATIONS

"Digital Subscriber Signalling System No. 1 (DSS 1), Network Layer, User–Network Management," CCITT Blue Book, vol. VI, Fascicle VI.11, Melbourne, Nov. 14–25, 1988, pp. 117, 137–138, 202–211.

Primary Examiner—Jeffery Hofsass
Assistant Examiner—Fan Tsang
Attorney, Agent, or Firm—E. Weiss; H. T. Brendzel

[57] ABSTRACT

A method and system for industry and group-specific calling within a telecommunication system. The method of the present invention includes the steps of receiving, in a carrier network, a call initiated by dialing a group number from a caller terminal; accessing a database in the carrier network to determine an announcement corresponding to the group number; providing the announcement to the caller terminal to prompt a caller to select one of the group members associated with the dialed group number; interpreting a selection command received from the caller to determine a member number of a selected group member; establishing a connection between the network and a member terminal corresponding to the selected member number; and connecting the call from the caller terminal to the selected member terminal. The caller may terminate the connection between the network and the member terminal, and select a connection to other group members, without dialing any additional numbers. Information such as the selection sequence, connect time, and call status may be transmitted by the carrier network to each member terminal prior to connection to the caller terminal.

28 Claims, 6 Drawing Sheets

| SEQUENCE NUMBER | AIRLINE | CALL STATUS | CALL TIME | TOTAL CONNECT TIME | OTHER NETWORK DATA |
|---|---|---|---|---|---|
| 1 | A | ANSWERED | 4:23 | 4:23 | |
| 2 | B | ABANDONED | 1:05 | 5:28 | |
| 3 | C | BUSY | 0:15 | 5:43 | |
| 4 | D | ANSWERED | 3:06 | 8:49 | |
| 5 | A | ANSWERED | 1:00 | 9:49 | |

FIG. 5

METHOD AND APPARATUS FOR GROUP-SPECIFIC CALLING

FIELD OF THE INVENTION

The present invention relates generally to improvements in telecommunication systems and services. More particularly, the present invention relates to techniques for efficiently accessing a group of called parties through a telecommunication system.

BACKGROUND OF THE INVENTION

In existing telecommunication systems there is typically a one-to-one relationship between a caller and a called party. Each called party generally has its own Inward Wide Area Telephone Service (INWATS) or Plain Old Telephone Service (POTS) number, and a caller dials the INWATS or POTS number to talk to the called party. The INWATS number is more commonly known, and will be referred to herein, as an 800 number. Often a caller will place several calls to related companies or special-interest groups in order to obtain certain desired information. For example, in making airline reservations, a caller desiring the best ticket price may call several airline companies, each of which will typically have different 800 or POTS numbers. The caller usually must therefore look up and separately dial several different numbers, and often may have difficulty locating a particular number. Even if the numbers for all the various airlines are 800 numbers, such that the caller is not charged for the calls, the need to make several separate calls often takes an excessive amount of time and is a source of considerable aggravation to the caller. The use of telephones with programmable memory and autodialing generally will not solve the problem, due to the large number of called parties which most callers will want to access.

An additional problem with existing multiple-party dialing techniques is that one called party usually does not have access to any information regarding other calls the caller has already made to related called parties. For example, the called party may be one of several companies in an industry which the caller is contacting in order to compare services, and the called party might better respond to the caller by knowing which other companies the caller has attempted to contact previously. In the airline reservation context, it may be useful for an airline to know that they are, for example, either the first or the last airline which people contact when calling several airlines seeking the best ticket price. An airline company might provide a discount to a loyal customer who repeatedly calls them first. The information could also be useful as, for example, a marketing tool to determine the effectiveness of an advertising campaign. In general, such information would allow called parties to develop a more appropriate response to the caller.

In many applications, a caller calling the INWATS or POTS number of a called party may wish to access other related called parties if the first called party is unavailable. Existing telecommunications systems are able to route an incoming call to one of several call destinations based upon caller speech commands or dual-tone multiple-frequency (DTMF) signaling from the caller telephone. See U.S. Pat. No. 4,827,500, entitled "Automatic Speech Recognition to Select Among Call Destinations", assigned to the assignee of the present invention, and incorporated by reference herein. However, such systems are generally maintained by a single called party for directing incoming calls within their business to one of several POTS numbers. The called party may maintain statistics regarding the routing of the incoming calls, but information regarding calls made by an incoming caller to other related called parties is generally not available. Prior art systems therefore typically do not permit calls to be placed to the different 800 or POTS numbers of, for example, different companies within the same industry, based upon a single call to a number established by a telecommunication service provider.

There are further disadvantages with existing 800 number systems and services. Under present practice, a called party establishes an 800 number by subscribing to the 800 service of one of several telecommunication service providers, which may be, for example, long distance carriers. After the number is established at the original telecommunication system provider, it is relatively easy for a called party to move their 800 number to another provider. While this present arrangement may provide some flexibility to the called party subscribers, the service provider may find it difficult to retain their original 800 number subscribers, and callers may experience erratic service due to repeated changeovers from one provider to another. If the number were established and maintained by the provider, the provider might experience less subscriber turnover, and thereby provide more consistent service to the callers.

As is apparent from the above, a need exists for efficient access to related members of an industry or other group through a telecommunication system, which avoids the need for a caller to separately dial each member of the group, and which can provide calling sequence and other information to the related group members, using a single number that may be established and maintained by a telecommunication service provider.

SUMMARY OF THE INVENTION

The present invention provides a method and system for accessing multiple called parties via a single group telephone number. The method of the present invention includes the steps of receiving, in a carrier network, a call initiated by dialing a group number from a caller terminal; accessing a database in the carrier network to determine an announcement corresponding to the group number; providing the announcement to the caller terminal to prompt a caller to select one of the group members corresponding to the dialed group number; interpreting a selection command received from the caller to determine a member number of the selected group member; establishing a connection between the network and a member terminal corresponding to the member number; and connecting the call from the caller terminal to the member terminal.

In accordance with one aspect of the present invention, the method may include the additional steps of terminating the connection between the network and a first member terminal in response to a termination command from the caller; providing the announcement to the caller terminal to prompt the caller to select another one of the group members associated with the dialed group number; interpreting another selection command received from the caller to determine the member number of the other selected group member; establishing a connection between the network and the other member terminal; and connecting the call from the caller terminal to the other selected member terminal. These steps may be repeated to permit the caller to contact as many group members as desired, without interrupting the single group call which established the connection between the caller terminal and the network.

In accordance with another aspect of the present invention, the method may include the steps of storing, in a network data register, call data regarding a call to at least one of the group members previously selected by the caller; formatting the call data stored in the data register into a data packet; and transmitting the data packet to a currently selected member terminal after establishing a connection between the network and that terminal. Information may also be stored regarding, for example, connect time or call status for connections to previously selected group member terminals.

As a feature of the present invention, efficient access to multiple called parties is provided. It is no longer necessary to separately dial each of the INWATS or POTS numbers of related called parties. Callers need not attempt to remember, or program their telephone autodialers, with, for example, multiple 800 numbers. Instead, a single number is dialed and the caller may conveniently select which members of the group to speak to, and the sequence in which they speak to them.

As another feature of the present invention, the group number assigned may be descriptive of, for example, the services provided by the group. Multiple group members may therefore be accessed using one easy-to-remember generic group number, such as 1-800-AIRLINE.

As an additional feature of the present invention, information regarding the caller's calling sequence may be provided to the various related called parties within a particular industry or other special-interest group. The called parties can thereby provide improved service to the callers.

As a further feature of the present invention, the group number may be established and maintained by a telecommunications service provider, such as a long distance carrier, rather than by a particular member of the group. This provides advantages to telecommunication service providers, in that a single company or individual within the group cannot unilaterally decide to move the group number to another service provider, and to callers, who receive more consistent service.

The above-discussed features, as well as additional features and advantages of the present invention, will become more readily apparent by reference to the following detailed description and the accompanying drawings.

BRIEF DESCRIPTION OF THE DRAWINGS

FIG. 5 shows exemplary contents of a data register within the network adjunct unit of FIG. 4.

DETAILED DESCRIPTION

The present invention provides a method and apparatus for accessing multiple called parties while dialing only a single telephone number. Although the following description is primarily directed to particular applications of the present invention, such as accessing multiple airline companies with a single call, it should be recognized that the present invention is applicable to a wide variety of other industry and special-interest group applications, including, for example, hotels, car rental companies, automobile dealers, stock brokers, mutual fund companies, manufacturers, restaurants and theaters. Furthermore, although the following description uses a particular carrier network for illustrative purposes, the group-specific calling of the present invention may be readily implemented using the existing equipment of most telecommunication service providers.

Figure 1:
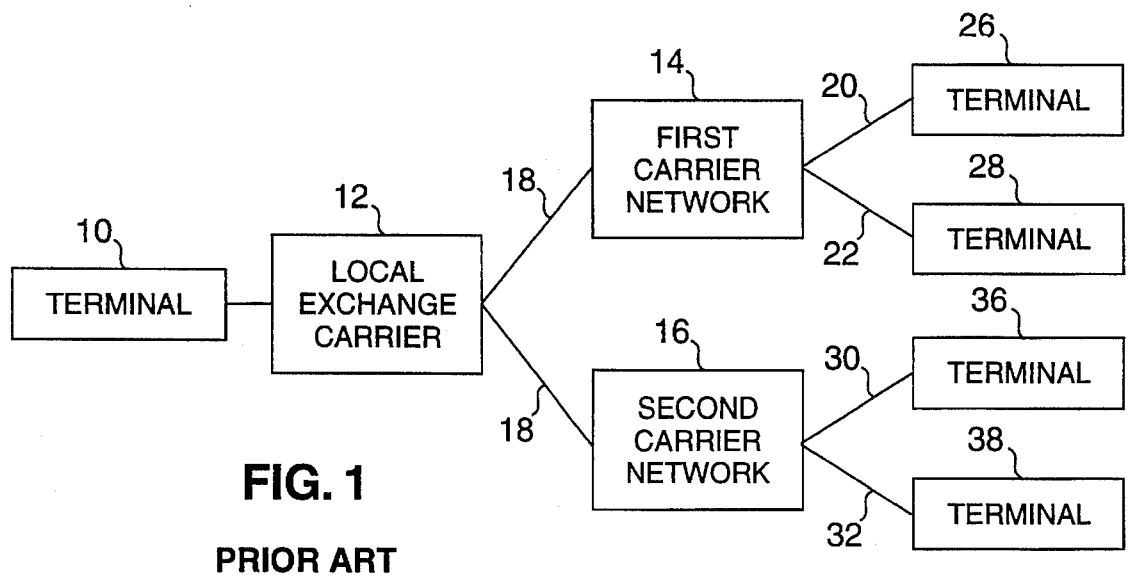
FIG. 1 is a block diagram illustrating caller access to a group of called party terminals in accordance with the prior art.

FIG. 1 is an exemplary illustration of prior art techniques for interconnecting a caller to multiple called parties. A caller terminal 10, typically a standard telephone, is used to dial the 800 or POTS number of a particular called party terminal. In this exemplary embodiment, each called party terminal has a different 800 number. The called party terminals will therefore be referred to as subscriber terminals, indicating that the owner of the terminal subscribes to an 800 service. A connection is established to a local exchange carrier (LEC) 12, which may be the telephone switching system of the local telephone company. The LEC 12 is capable of establishing a connection between caller terminal 10 and one of a number of telecommunication service provider networks 14, 16 over a communication link 18, in a manner well known in the art. The telecommunication service provider networks may be, for example, long distance carrier networks, and the link 18 may be fiber optic cable. For simplicity, the telecommunication service provider networks will be referred to herein as carrier networks. The first carrier network 14 can establish a connection over lines 20, 22 to a plurality of 800 number subscriber terminals 26, 28. A suitable manner in which this connection may be made is disclosed in, for example, U.S. Pat. No. 4,191,860, entitled "Data Base Communication Call Processing Method" assigned to the assignee of the present invention and incorporated by reference herein. Similarly, second carrier network 16 can establish connections over lines 30, 32 to a plurality of its 800 subscriber terminals 36, 38.

In order to reach each of the 800 subscribers, or called parties, a caller typically must dial, from caller terminal 10, the 800 number of each of the called parties 26, 28, 36 and 38. If each of the 800 numbers were, for example, airline companies, the caller has to dial each one separately, and the carrier network establishes a separate connection from caller to called party each time. Generally, each of the airline companies does not subscribe to the 800 service of the same carrier network, and it is therefore not possible to provide connections to multiple 800 subscribers based on a single call through one network. The two subscriber terminals 26, 28 may each belong to different airlines which establish their 800 numbers with first carrier network 14, while the two subscriber terminals 36, 38 each belong to different airlines which establish their 800 numbers with second carrier network 16. As noted above, the multiple dialing required using this existing system is very inefficient, as well as aggravating to the callers.

Figure 2:
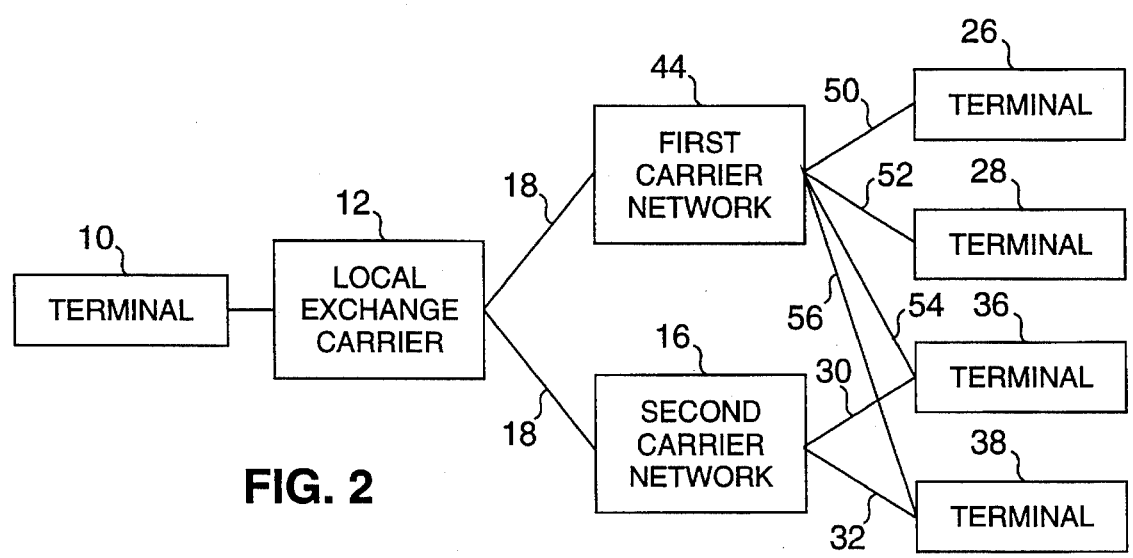
FIG. 2 is a block diagram illustrating caller access to a group of called party terminals in a telecommunication system in accordance with the present invention.

FIG. 2 is a block diagram illustrating caller access to multiple called parties in accordance with the present invention. In the exemplary telecommunication system shown, the operation of caller terminal 10, LEC 12, links 18, and second carrier network 16 is as previously described. A first carrier network 44 in accordance with the present invention replaces the first carrier network 14 of the prior art system in FIG. 1. The carrier network 44, which will be discussed in greater detail below, is capable of establishing a connection to each of the 800 subscriber terminals, including subscriber terminals 36, 38 previously associated only with the second carrier network 16. The carrier network 44 provides this function by establishing a group number which encompasses a plurality of subscriber terminals. Because the owner of each subscriber terminal may be a member of a group, the terminals are more generally referred to herein as member terminals. In the airline context, an exemplary group number which could encompass a group of airline companies is 1-800-AIRLINE. The group number may be established by a telecommunication service provider, such as the provider of network 44, instead of by the airline companies, each of which generally establishes its own 800 number in existing systems. Each of the subscriber terminals 26, 28, 36 and 38 can then be independently accessed over the carrier network 44, by a single call to the group number. A working telephone number (WTN) for each subscriber terminal is maintained within a group number database at the carrier network 44, such that the caller dialing the group number may be connected to one or more of the subscriber terminals, in a sequence selected by caller voice or DTMF commands. The subscriber terminals 36, 38 may also maintain their 800 numbers established with the provider of second carrier network 16, such that callers may access subscriber terminals 36, 38 by the specific subscriber 800 number or by the group number established by the provider of the first carrier network 44.

Figure 3:
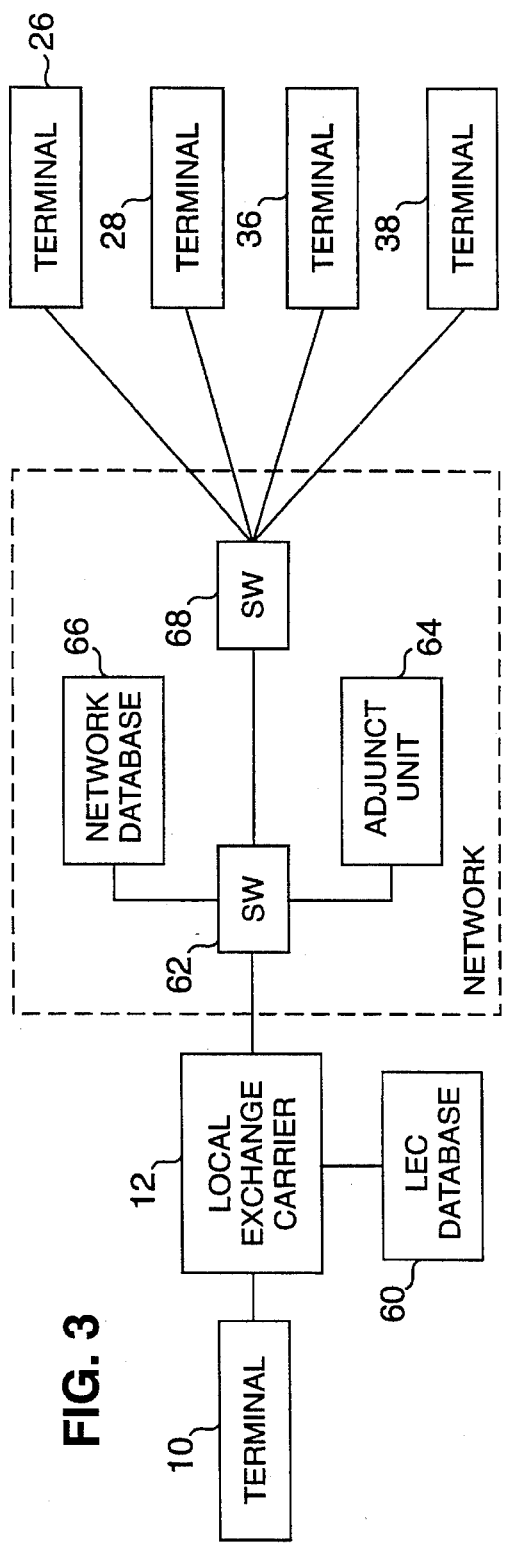
FIG. 3 is a more detailed block diagram of a portion of the exemplary telecommunication system of FIG. 2.

FIG. 3 is a more detailed illustration of the first carrier network 44 within the telecommunications system of FIG. 2. An LEC database 60 is also shown. A call received by LEC 12 from caller terminal 10 is identified within LEC 12 as, for example, an 800 number. The LEC 12 accesses LEC database 60 to determine which carrier network the dialed 800 number has been established with, and then connects the call to that carrier network. In this example, it is assumed that the 800 number dialed is a group number established by the first carrier network 44. The call is received within a first switch 62 within the switch network of carrier network 44. The first switch 62 may be a stored program-controlled switching system with Common Channel Signaling (CCS) capability, such as the 4ESS® switching system manufactured by American Telephone & Telegraph Co., Inc. (AT&T). The CCS capability provides a high speed packet-switched data link for carrying network control information independently of the voice communication paths. Network control using CCS is disclosed in, for example, U.S. Pat. No. 4,162,377, entitled "Data Base Auto Bill Calling Using CCIS Direct Signaling," and U.S. Pat. No. 4,277,649, entitled "Method and Apparatus for Screening Telephone Calls," both assigned to the assignee of the present invention and incorporated by reference herein.

The switch 62 accesses a network database 66 to translate the received 800 number into an internal routing number, also referred to as an action point number (APN), which specifies further processing for the call. The network database 66 contains routing instructions for a plurality of 800 numbers, and therefore may also be referred to as a routing instruction database or an 800 number database. When the network database 66 identifies the call as a group number call, it directs switch 62 to route the call to a network adjunct unit 64 for further processing. The network adjunct unit includes hardware, to be described in greater detail below, to prompt the caller for commands identifying various members of the group, to match the commands with the WTNs of the various group members, and to store call information regarding call sequence, connect time and the like. In response to routing information from the network adjunct unit 64, the call may be routed through a second switch 68, which also may be a 4ESS® switching system, to any one of the subscriber terminals 26, 28, 36 and 38. After the caller completes a call to one member of the group, referred to herein as a member call, the network adjunct unit retains control over the group call, permitting the caller to select, via voice or DTMF commands, to speak with another group member. The network adjunct unit also stores information about the group call, such as the sequence of group members selected and the connect time with each group member, and is capable of transferring this information to the group members.

Figure 4:
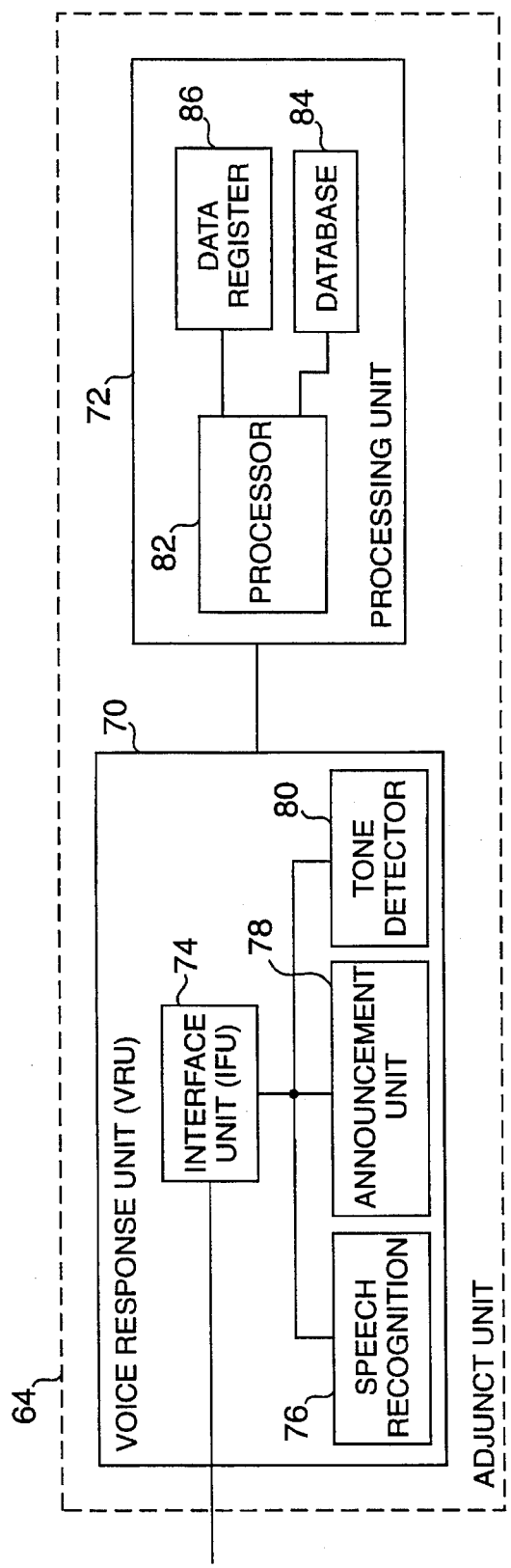
FIG. 4 is a block diagram of an exemplary network adjunct unit within the telecommunication system of FIG. 2.

A block diagram of one embodiment of the network adjunct unit 64 in accordance with the present invention is shown in FIG. 4. The network adjunct unit 64 includes a voice response unit (VRU) 70 and a processing unit 72. An interface unit (IFU) 74 within VRU 70 receives an incoming call from switch 62 and supplies it to processing unit 72. The VRU 70 also includes a speech recognition unit 76 for interpreting caller voice commands, an announcement unit 78 for playing an appropriate announcement to a caller dialing a particular group number, and a tone detection unit 80 for interpreting caller DTMF commands. A processor 82 within the processing unit 72 receives an incoming group number from the IFU 74 and matches that group number with one of a plurality of group numbers stored within a group number database 84. The database 84 includes additional information regarding, for example, an announcement made to the caller in response to the group number dialed. The announcement may be, for example, a single recorded announcement or a series of interactive prompts. The database 84 may also include the WTNs of each of the group members, such that the interpreted selection commands may be used to determine a WTN, or member number, for each selected group member.

The processing unit 72 also includes a data register 86 which is used to store information, or call data, about a call to a group number. In general, by dialing a single group number, the caller may access several different group members, in a sequence chosen by the caller. The data register 86 is used to store group call data such as the sequence in which the caller accesses the various group members, the connect time to each group member, the total group call connect time, and other call information. The network adjunct unit 64, after playing an announcement corresponding to the group number dialed, will allow a caller to select, via voice or DTMF commands, the first member of the group which they would like to contact. The processor 82 directs the IFU to initiate a member call to the WTN, or member number, of the selected group member. After the caller has received the desired information from that group member, or if that member is busy or puts the caller on hold, the caller may, for example, execute a DTMF command, such as "" by pushing the star key twice on a touch-tone telephone keypad. The processor 82 directs the IFU 74 to terminate the previously selected member call, while the group call, connecting the caller to switch 62 and adjunct unit 64, is maintained. The DTMF command is recognized by the tone detector 80 within VRU 70, and prepares the VRU to receive another voice or DTMF command regarding the next group member the caller wishes to speak to. When the caller selects another group member, the data register 86 is updated to store information regarding the previously selected member call. The processor 82 then directs the IFU 74** to initiate another member call to contact the currently selected group member.

FIG. 5 shows exemplary contents of the data register 86 within the processing unit 72 of FIG. 4. The data register 86 contains several columns of call data, corresponding to a single group call. In a first data column 92, a sequence number is stored, representing the order in which the group members are contacted by the caller. A second data column 92 stores an identifier for each group member contacted. In the exemplary data register shown, identifiers A, B, C and D are stored, each representing a different airline company. A third data column 96 indicates the status or result of the contact with each group member in the sequence, while a fourth column 98 indicates the time spent in contact with each group member. The total elapsed connect time for the group call is stored in a fifth column 100. Additional network data regarding the group call may be stored in other data columns in register 86, such as sixth data column 102.

In the exemplary group call shown, a caller dialed a group number such as 1-800-AIRLINE, and was prompted, via VRU 70, to select a particular airline within the group using a voice or DTMF command. The caller selected airline A as the first airline company in the group to contact. The call data stored in row 104 of the data register 86 indicate that airline A answered the call, and that the caller was connected to airline A for four minutes and 23 seconds. After the member call to airline A was completed, the caller was prompted by the VRU 70 and selected another airline company, airline B. The data stored in row 106 indicate that the caller spent one minute and five seconds in attempting to establish a contact with airline B, and then abandoned the attempt. Airline B may have, for example, failed to answer the member call promptly. The adjunct unit 64, which directs the initiation and termination of the member calls made within a group call, is able to determine, for example, whether a member call was connected or abandoned prior to connection, or whether the caller received a busy signal. The data stored in row 108 indicate that after terminating the attempt to contact airline B, the caller selected airline C. A busy signal was obtained, and the caller terminated contact with airline C after approximately fifteen seconds. After the busy signal at airline C, the caller selected airline D. The data in row 110 indicate that airline D answered the call and was connected to the caller terminal for a period of three minutes and six seconds. After the caller has initially selected and attempted member calls to each of the airlines A, B, C and D, and prior to the termination of the group call, the caller may again select, for example, airline A after comparing ticket prices at airline D. A fifth row 112 of group call data indicates that the caller again selected airline A, and was connected for one minute to, for example, confirm a ticket purchase. The caller can thus select any order of member calls, including repeated calls to the same group member WTN. Finally, the caller terminated the group call by hanging up. The caller was thus able to efficiently contact four different airlines, and confirm a ticket purchase at the best price, with a single call to a group telephone number. Using this group-specific calling, the caller may receive more prompt service from the various airline companies given how quickly and easily the caller can access the competition.

The group call data stored in data register 86 may be provided to the airline companies A, B, C and D by assembling the data register contents into a data packet which may be transmitted to each called party, or group member, prior to connection to the caller terminal. The data packet may be transmitted using the Integrated Services Digital Network (ISDN) Q.931 standard message set. The data packet is transmitted on the Q.931 user-to-user element, or D-channel data path, in an initial call set-up message provided from the network to a member terminal. The user-to-user element is a standard T1 data link, operating at 1,544 Mbits/sec. The ISDN Q.931 standard is described in, for example, CCITT Blue Book, Volume VI, "Digital Subscriber Signalling System No. 1", pp. 117, 137–138, and 202–211, November, 1988. As was previously mentioned, the transmitted call data could be used for a number of different purposes. For example, an airline might give a discount to a caller who chose them first. An airline could handle a caller more carefully if the call status indicates that the caller has quickly abandoned calls to previous members of the group after short periods of time. An airline could use their average position in the sequence to measure the effectiveness of an advertising campaign. Other types of call data transmitted to the group members might include the POTS number of the caller terminal, so that an airline unable to answer a member call could return the call at a more convenient time. The group-based calling of the present invention could thus provide an efficient way for an airline to monitor and respond to all incoming member calls, even those which are terminated before an actual voice connection is established. The caller could be given the option of asking for a return call prior to selecting another airline in the group, so that the previous airline knows that the caller is still interested. The stored call data could provide similar advantages to the group members in other applications.

Figure 6:
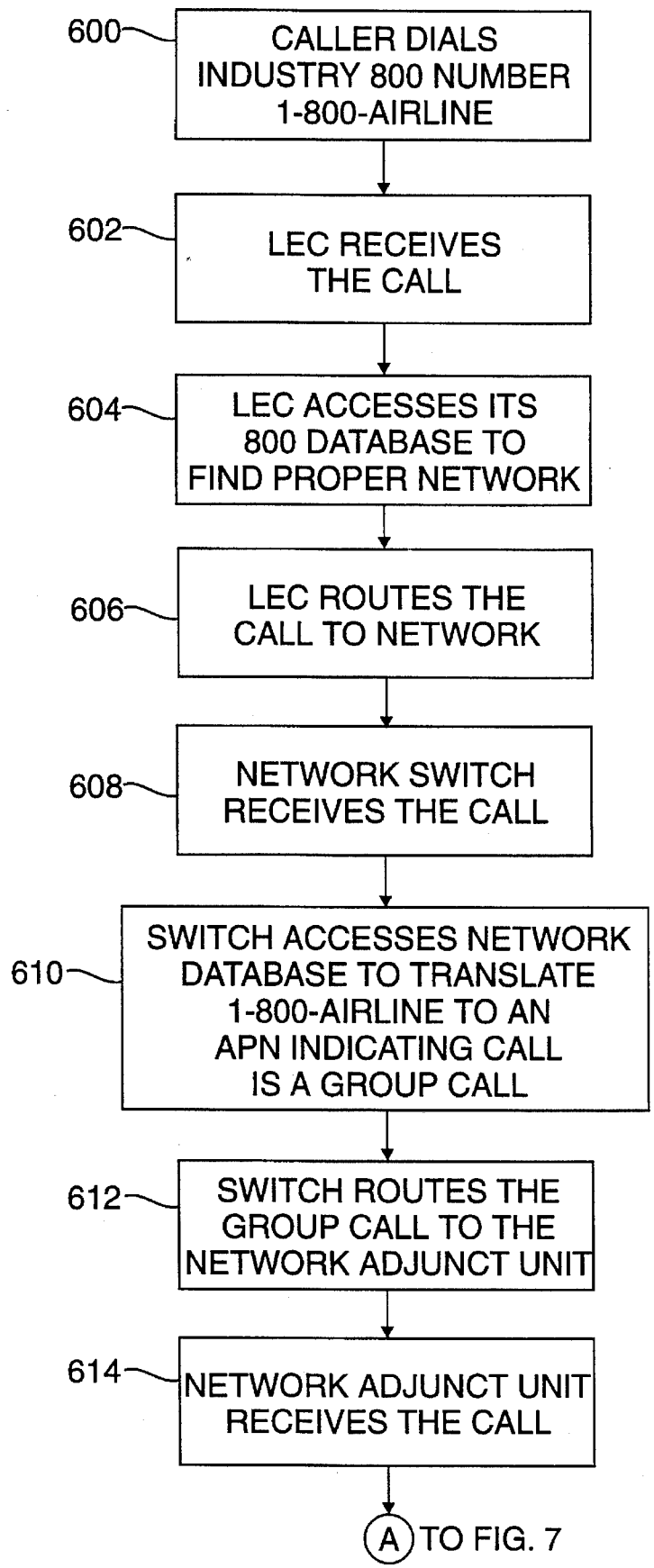
FIG. 6 is a flow chart showing the steps between caller dialing of a group number and receipt of the call in the network adjunct unit.

The steps between a caller dialing a group number and the receipt of a call in the network adjunct unit are shown in operation blocks 600 to 614 of the flow chart in FIG. 6. A caller first dials a group number, such as 1-800-AIRLINE, from caller terminal 10. The exemplary group number thus represents an 800 number for an industry, rather than for a single company or organization. The LEC 12 receives the call, accesses a list of 800 numbers stored in LEC database 60 to determine the proper carrier network for that group number, and routes the call to that carrier network. The carrier network receives the group call in the network switch 62, and accesses the network database 66 to translate the group number 1-800-AIRLINE into an APN. The APN corresponding to a group number directs the switch 62 to route each group call to the network adjunct unit 64. The network adjunct unit 72 then receives the group call from the network switch 62, as indicated in operation block 614.

Figure 7:
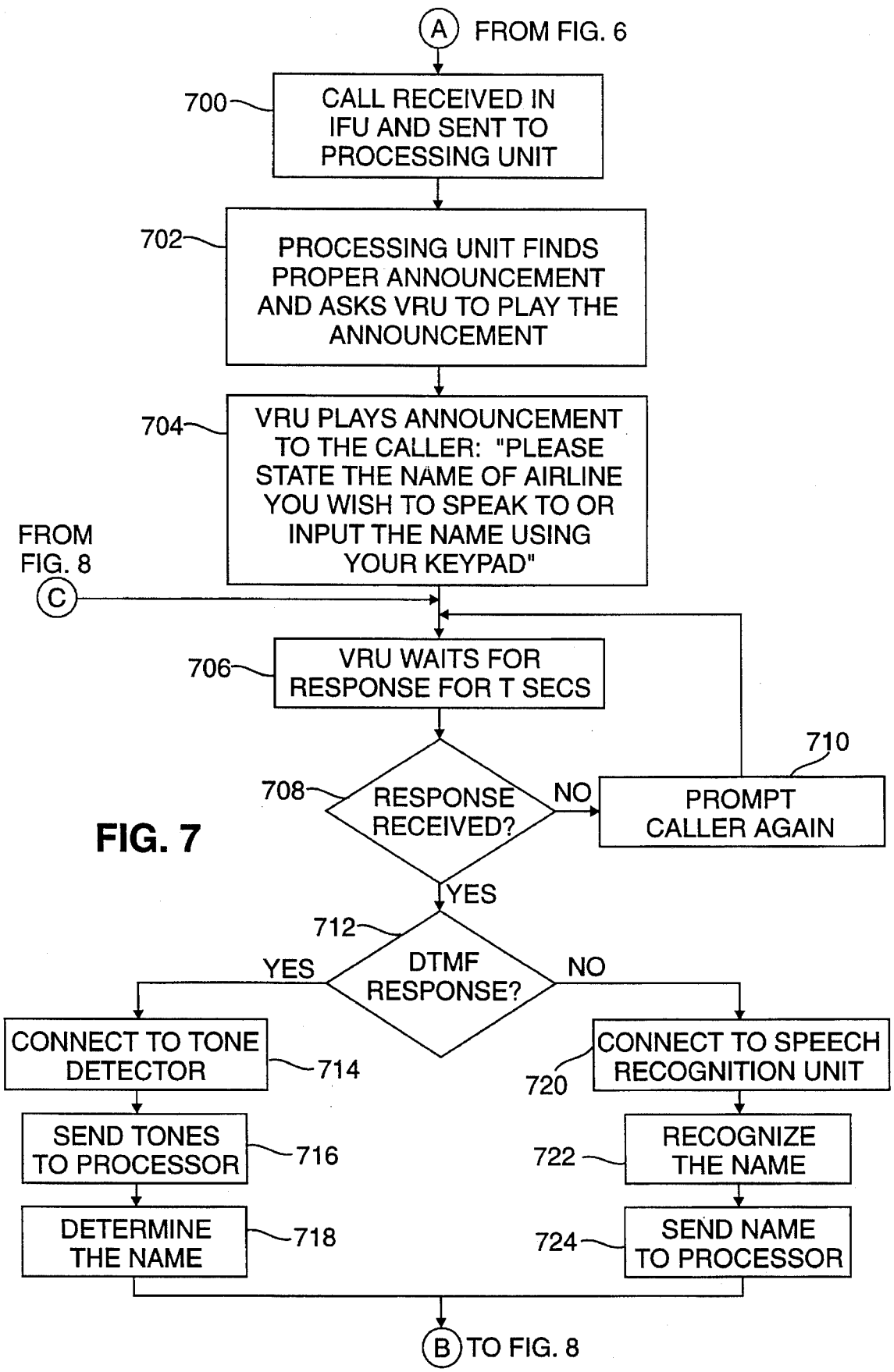
FIGS. 7 and 8 are flow charts which show the processing of a call within a carrier network in accordance with the present invention.
Figure 8:
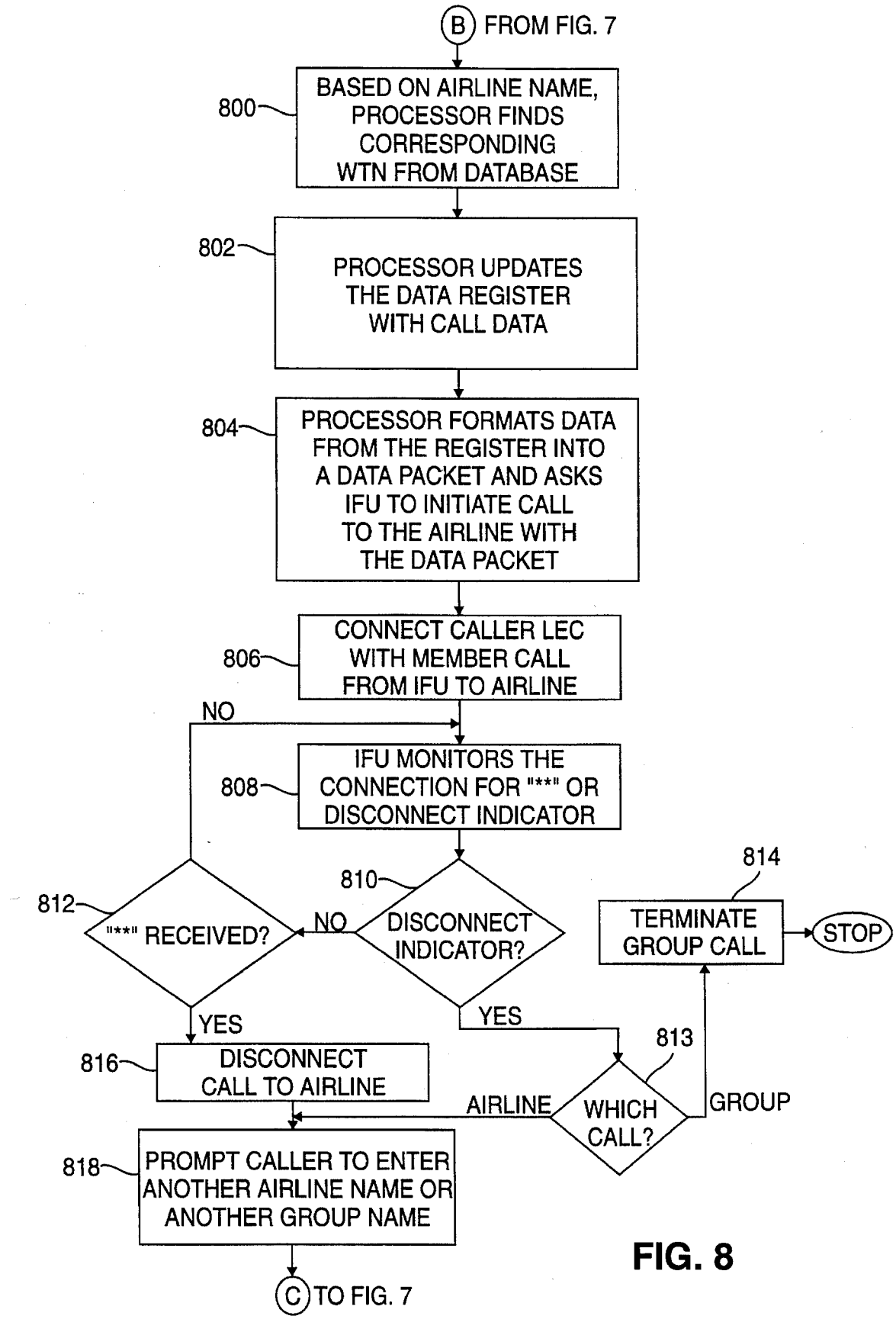

The processing of a group call within the adjunct unit 64 is shown in the flow charts of FIGS. 7 and 8. In the operation block 700, the call is received in the IFU 74, and sent to the processing unit 72. The processing unit 72 then attempts to find, within its group number database 84, an announcement corresponding to the dialed group number. When the proper announcement is found, the processing unit directs the VRU 70 to play the announcement for the caller. An exemplary announcement, as shown in operation block 704, is: "Please state the name of the airline you wish to speak to or input the name using your telephone keypad." Alternative announcements may be used, such as: "Please input the first three letters of the airline name using your telephone keypad." The former announcement is suitable for most callers, even those with rotary or pulse-dial telephones which lack DTMF command capability. The VRU 70 then waits a predetermined time of T seconds for a response to its prompt. The time T may vary depending upon the application, but will generally be on the order of several seconds. After the T second wait, the VRU determines if a response has been received from the caller. If no response is received, the VRU again prompts the caller with an announcement, as shown in block 710, and then returns to block 706 to again wait for a response. The caller eventually may be disconnected for failure to respond after a predetermined number of repeated prompts.

When a response is received, the VRU determines if the response is a DTMF command or a voice command, in decision block 712. DTMF and voice commands can be readily distinguished using well-known techniques. If a DTMF command is received, it is processed within operation blocks 714 to 718. In these blocks, the call is connected to the tone detector 80, which decodes DTMF command tones and sends them to processing unit 72. In processing unit 72, the processor 82 accesses database 84 to determine the name of the airline which was entered by the caller via the DTMF commands. If the caller responds to the VRU prompt with a voice command, the command is processed through the operation blocks 720 to 724. In these blocks, the call is connected to speech recognition unit 76, which recognizes the airline name from the caller's spoken command. The speech recognition unit 70 then sends the airline name to the processing unit 72.

The processor 82 within processing unit 72 then accesses database 84 to determine, based upon the selected airline name, a WTN identifying the appropriate telephone line and terminal to which the call should be routed for connecting the caller to the airline. The database 84 stores a separate WTN, or member number, for each of the airlines in the group. At this time the processor 82 updates the group call data stored in the data register 86 with an airline identifier, a sequence number, the starting time for the connection to that airline, as well as other call data, as indicated by operation block 802. The processor 82 also formats the data stored within the data register into a data packet, using, for example, the ISDN Q.931 message set. As noted above, the ISDN Q.931 standard includes a user-to-user element, or D-channel, suitable for transmitting the data packet. The data packet is typically sent on this ISDN D-channel data link prior to establishing a voice connection to the member terminal.

After the group member terminal has been identified by a WTN and the updated call data in data register 86 has been assembled into a data packet, both the WTN number and the data packet are supplied to the IFU 74. The IFU then initiates an outgoing member call via switch 68 to the WTN of the selected airline, and transfers the data packet over the resulting D-channel data connection. The LEC 12, through which the group call was initiated, is then bridged, or connected, with the switch 68 through which the outgoing member call was made, thereby connecting the caller with the group member terminal, as indicated in operation block 806. The group member terminal is thus supplied with a data packet containing the group call data in data register 86 prior to connection with the caller terminal. Alternatively, the call data packet could be transmitted after the voice connection is established, over the D-channel data link or another suitable transmission medium.

Once the caller terminal is connected to a group member terminal, the IFU 74 monitors the connection for certain DTMF or voice commands, or a disconnect indicator. At any time during the connection with an airline, the caller could simply push one or more keys on a touch-tone telephone to generate a recognizable DTMF key command, such as """ which indicates that the caller wishes to speak to another member of the group. Alternatively, the caller could execute one of a number of voice commands which could be sensed by the IFU 74 and supplied to the speech recognition unit 80. In the decision block 810, the IFU monitors the connection for the disconnect indicator, which indicates that either the caller or the group member has hung up. If the disconnect indicator is found, the IFU determines which call has been disconnected, the group call from the caller terminal, or the member call from the network to the member terminal, as shown in decision block 813. If the disconnect indicator is from the caller terminal, the IFU terminates the group call connection between the network and the caller, as shown in operation block 814. If the disconnect indicator is from the member terminal, the group call is maintained and the caller is prompted, in operation block 818, to select another airline name.

If the disconnect indicator is not found, the caller is still connected with an airline, and the IFU therefore looks for a caller command, such as the """ DTMF command, to determine if the caller wishes to establish a connection to another group member. If the caller command is not received, decision block 812 directs the IFU to continue monitoring the connection between the caller terminal and the airline, via a return to operation block 808. When a caller command is detected, the IFU directs the switch 68 to terminate the connection to the airline. The connection between adjunct unit 64 and the caller terminal, however, is maintained. The caller is again prompted by VRU 70 to select another airline within the group, as indicated by operation block 818, and the call flow returns to operation block 706 in FIG. 7 to wait for a caller response to the prompt. The caller can then establish connections to other airlines, in the manner described above, while the data register is updated with each connection and supplied to each airline contacted. Alternatively, the caller could also be prompted to enter other group names, by voice or DTMF commands, to gain access to other groups without hanging up and dialing a new group number. For example, a caller who has just completed a series of member calls to an airline group resulting in a ticket purchase, as in FIG. 5, may then be interested in reserving a hotel or rental car. The caller could therefore enter a new group name, such as "Hotels" or "Car Rentals" in order to receive a new prompt asking for the name of a specific member of the new group.

As discussed above, the present invention may provide information on a caller's selections to the group members. Any resulting privacy concerns may be addressed by, for example, giving callers the option to disable the information transfer to one or more particular group members by executing a voice or DTMF command in response to a prompt from announcement unit 78. Alternatively, by advertising the service to all callers as including the caller sequence information transfer, any callers with privacy concerns could decline to use the group number, and instead use the individual 800 number of a particular group member. One advantage of the present invention is that each group member may continue to maintain their existing 800 number, with any service provider, to accommodate callers unaware of or uncomfortable with the group number.

Although the foregoing detailed description has described the present invention primarily in terms of a particular application of group-specific calling, it should be understood that the embodiments discussed are exemplary only. Many variations may be made in the arrangements shown, including the type of carrier network, the specific hardware contained therein, the quantity and arrangement of group member terminals accessed, and the types of telephone numbers at caller and member terminals. These and other alternatives and variations will be readily apparent to those skilled in the art, and the present invention is therefore limited only by the appended claims.

We claim:

1. A method of processing a call in a telecommunication system, comprising the steps of:

receiving a group call initiated by a caller dialing a group number from a caller terminal, wherein the group number is assigned to a group including a plurality of members having distinct member numbers;

receiving a sequence of selection commands entered by the caller during the group call, the selection commands indicating the particular group members selected by the caller;

interpreting the selection commands received from said caller to determine the corresponding member numbers of the selected group members;

connecting said group call from said caller terminal in accordance with the selection command sequence to selected member terminals corresponding to the member numbers of the selected group members; and transmitting call data, the call data regarding a connection of the group call to one of the selected member terminals, to another of said selected member terminals to which said group call is subsequently connected.

2. The method of claim 1 further including the additional steps of:

terminating a connection of said group call to one of said selected member terminals in response to a termination command from said caller; and providing an announcement to said caller terminal to prompt said caller to select another one of said plurality of group members associated with said dialed group number.

3. The method of claim 2 wherein said additional steps are repeated until said group call is terminated in response to a disconnect signal received from said caller terminal.

4. The method of claim 1 wherein said group members are different companies within an industry.

5. The method of claim 1 wherein said group number is established by a network provider.

6. The method of claim 1 wherein said group number is an 800 number.

7. The method of claim 1 further including the steps of:

accessing a network database to determine an announcement corresponding to said dialed group number; and providing said announcement to said caller terminal to prompt said caller to select one of said plurality of group members corresponding to said dialed group number.

8. The method of claim 1 further including the steps of:

storing said call data in a network data register; and formatting said call data stored in said data register into a data packet suitable for transmission.

9. The method of claim 1 wherein said call data includes an amount of time for which said connection of said group call to said one of the selected member terminals was maintained.

10. The method of claim 1 wherein said call data includes an indication that said one of the member terminals was busy when said connection of said group call to said one of the selected member terminals was made.

11. The method of claim 1 wherein said call data includes an indication that said group call was answered by a group member corresponding to said one of the selected member terminals.

12. The method of claim 1 wherein said call data includes a total connection time for which said group call has been maintained.

13. The method of claim 1 further including the step of accessing a local exchange carrier database prior to establishing a connection between said caller terminal and a network, in order to determine to which of several networks said caller terminal should be connected.

14. The method of claim 1 wherein said step of receiving said group call further includes the steps of:

accessing a network database to determine an internal routing number indicative of subsequent processing of said group call; and routing said group call to a network adjunct unit in response to said internal routing number, said network adjunct unit receiving and interpreting said selection commands from said caller.

15. An apparatus for processing a call in a telecommunication system, comprising:

a first switch for receiving a group call initiated by a caller dialing a group number from a caller terminal, wherein the group number is assigned to a group including a plurality of members having distinct member numbers;

an adjunct unit for receiving said group call from said first switch;

a detector in said adjunct unit for interpreting a sequence of selection commands entered by the caller and received from said caller terminal, the selection commands indicating the particular group members selected by the caller a second switch for establishing connections in accordance with the selection command sequence between said first switch and selected member terminals corresponding to the member numbers of the selected group members; and means for transmitting call data, the call data regarding a connection of the group call to one of the selected member terminals, to another of said selected member terminals to which said group call is subsequently connected.

16. The apparatus of claim 15 further including means for terminating said connection between said first switch and said one of said selected member terminals in response to a termination command from said caller, while said group call is maintained, to thereby permit said caller to select another member of said group.

17. The apparatus of claim 15 wherein said group members are different companies within an industry.

18. The apparatus of claim 15 further including:

a network data register for storing said call data; and means for formatting said call data stored in said data register into a data packet suitable for transmission.

19. The apparatus of claim 15 wherein said call data includes an indication that said one of the member terminals was busy when said connection of said group call to said one of the selected member terminals was made.

20. The apparatus of claim 15 wherein said call data includes a total connection time for which said group call has been maintained.

21. A method of processing a call in a telecommunication system, comprising the steps of:

receiving a group call initiated by a caller dialing a group number from a caller terminal;

providing an announcement to said caller terminal to prompt said caller to select one of a plurality of group members corresponding to said group number;

interpreting a selection command received from said caller to determine a member number of a selected group member;

connecting said group call from said caller terminal to said member terminal;

storing call data regarding said connection of said group call to said member terminal of said selected group member; and transmitting said call data to a member terminal of a group member subsequently selected by said caller during said group call.

22. The method of claim 21 wherein said call data includes an amount of time for which said connection of said group call to said member terminal of said selected group member was maintained.

23. The method of claim 21 wherein said call data includes an indication that said member terminal of said selected group member was busy when said connection of said group call to said member terminal of said selected group member was made.

24. The method of claim 21 wherein said call data includes an indication that said selected group member answered said call from said caller after said connection of said group call to said member terminal of said selected group member was made.

25. The method of claim 21 wherein said call data includes a total connection time for which said group call has been maintained.

26. An apparatus for processing a call in a telecommunication system, comprising:

a first switch for receiving a group call initiated by a caller dialing a group number from a caller terminal;

an adjunct unit for receiving said call from said switch, and for prompting said caller to select one of a plurality of group members associated with said dialed group number;

a detector in said adjunct unit for interpreting a selection command received from said caller terminal indicating a selection of a group member;

a second switch for establishing a connection of said group call to a member terminal corresponding to a selected member number stored in a database;

means for storing call data regarding said connection to said member terminal of said selected group member; and means for transmitting said call data to a member terminal of a group member subsequently selected by said caller during said group call.

27. The apparatus of claim 26 wherein said call data includes an indication that said selected group member terminal was busy when said connection of said group call to said selected member terminal was made.

28. The apparatus of claim 26 wherein said call data includes a total connection time for which said group call has been maintained.

* * * * *